United States Patent
Teishev et al.

(10) Patent No.: US 10,564,563 B2
(45) Date of Patent: Feb. 18, 2020

(54) ELECTROSTATIC INK COMPOSITION

(71) Applicant: HP Indigo B.V., Amstelveen (NL)

(72) Inventors: Albert Teishev, Nes Ziona (IL); Hanit Marom Tchaicheeyan, Nes Ziona (IL); Igor Shutyi, Nes Ziona (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 16/307,239

(22) PCT Filed: Oct. 14, 2016

(86) PCT No.: PCT/EP2016/074711
§ 371 (c)(1),
(2) Date: Dec. 5, 2018

(87) PCT Pub. No.: WO2018/068862
PCT Pub. Date: Apr. 19, 2018

(65) Prior Publication Data
US 2019/0294070 A1 Sep. 26, 2019

(51) Int. Cl.
*G03G 9/13* (2006.01)
(52) U.S. Cl.
CPC .............. *G03G 9/131* (2013.01); *G03G 9/13* (2013.01); *G03G 9/132* (2013.01); *G03G 9/133* (2013.01)
(58) Field of Classification Search
None
See application file for complete search history.

(56) References Cited

U.S. PATENT DOCUMENTS

| | | | |
|---|---|---|---|
| 3,960,737 A * | 6/1976 | Kawanishi | G03G 9/131 430/114 |
| 5,025,067 A | 6/1991 | Yamamoto et al. | |
| 7,611,815 B2 | 11/2009 | Sugiura et al. | |
| 8,053,155 B2 | 11/2011 | Ariyoshi et al. | |
| 9,250,550 B2 | 2/2016 | Sumioka | |
| 2008/0152856 A1 | 6/2008 | Keipert et al. | |
| 2013/0196258 A1 * | 8/2013 | Inaba | G03G 9/08755 430/105 |
| 2015/0328490 A1 | 11/2015 | McDaniel | |

FOREIGN PATENT DOCUMENTS

| | | |
|---|---|---|
| WO | 2013107523 | 7/2013 |
| WO | 2014079480 | 5/2014 |

OTHER PUBLICATIONS

International Search Report dated Jun. 6, 2017 for PCT/EP2016/074711, Applicant Hewlett-Packard Indigo B.V.

* cited by examiner

*Primary Examiner* — Janis L Dote
(74) *Attorney, Agent, or Firm* — Thorpe North & Western LLP

(57) ABSTRACT

Described herein is a liquid electrostatic ink composition. The composition may comprise: a. a carrier liquid; and b. chargeable particles suspended in the carrier liquid, wherein the chargeable particles comprise a thermoplastic resin formed from the reaction of a first resin and a second resin, wherein i. the first resin comprises a polymer having acidic side groups; and ii. the second resin comprises an epoxy resin component and an elastomeric component, wherein the epoxy resin component has one or more epoxide groups per molecule.

20 Claims, No Drawings

ELECTROSTATIC INK COMPOSITION

BACKGROUND

Electrophotographic printing processes, sometimes termed electrostatic printing processes, typically involve creating an image on a photoconductive surface, applying an ink having charged particles to the photoconductive surface, such that they selectively bind to the image, and then transferring the charged particles in the form of the image to a print substrate.

The photoconductive surface may be on a cylinder and is often termed a photo imaging plate (PIP). The photoconductive surface is selectively charged with a latent electrostatic image having image and background areas with different potentials. For example, an electrostatic ink composition including charged particles in a liquid carrier can be brought into contact with the selectively charged photoconductive surface. The charged particles adhere to the image areas of the latent image while the background areas remain clean. The image is then transferred to a print substrate (e.g., paper) directly or by being first transferred to an intermediate transfer member, which can be a soft swelling blanket, which is often heated to fuse the solid image and evaporate the liquid carrier, and then to the print substrate.

DETAILED DESCRIPTION

Before the compositions, methods and related aspects of the disclosure are disclosed and described, it is to be understood that this disclosure is not restricted to the particular process features and materials disclosed herein because such process features and materials may vary somewhat. It is also to be understood that the terminology used herein is used for the purpose of describing particular examples. The terms are not intended to be limiting because the scope is intended to be limited by the appended claims and equivalents thereof.

It is noted that, as used in this specification and the appended claims, the singular forms "a", "an", and "the" include plural referents unless the context clearly dictates otherwise.

As used herein, "liquid carrier", "carrier", or "carrier vehicle" refer to the fluid in which the polymer resin, absorber(s), charge directors and/or other additives can be dispersed to form a liquid electrostatic ink or electrophotographic ink. Liquid carriers can include a mixture of a variety of different agents, such as surfactants, co-solvents, viscosity modifiers, and/or other possible ingredients.

As used herein, "electrostatic ink composition" generally refers to an ink composition, which may be in liquid form, generally suitable for use in an electrostatic printing process, sometimes termed an electrophotographic printing process. The electrostatic ink composition may include chargeable particles suspended in a liquid carrier, which may be as described herein.

As used herein, "co-polymer" refers to a polymer that is polymerized from at least two monomers.

As used herein, "melt flow rate" generally refers to the extrusion rate of a resin through an orifice of defined dimensions at a specified temperature and load, usually reported as temperature/load, for example, 190° C./2.16 kg. Flow rates can be used to differentiate grades or provide a measure of degradation of a material as a result of molding. In the present disclosure, "melt flow rate" is measured per ASTM D1238-04c Standard Test Method for Melt Flow Rates of Thermoplastics by Extrusion Plastometer. If a melt flow rate of a particular polymer is specified, unless otherwise stated, it is the melt flow rate for that polymer alone, in the absence of any of the other components of the electrostatic composition.

As used herein, "acidity", "acid number", or "acid value" refer to the mass of potassium hydroxide (KOH) in milligrams that neutralizes one gram of a substance. The acidity of a polymer can be measured according to standard techniques, for example, as described in ASTM D1386. If the acidity of a particular polymer is specified, unless otherwise stated, it is the acidity for that polymer alone, in the absence of any of the other components of the liquid toner composition.

As used herein, "melt viscosity" generally refers to the ratio of shear stress to shear rate at a given shear stress or shear rate. Testing is generally performed by using a capillary rheometer. A plastic charge is heated in the rheometer barrel and is forced through a die with a plunger. The plunger is pushed either by a constant force or at constant rate depending on the equipment. Measurements are taken once the system has reached steady-state operation. One method used is measuring Brookfield viscosity @ 140° C., units are mPa·s or cPoise. In some examples, the melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate. If the melt viscosity of a particular polymer is specified, unless otherwise stated, it is the melt viscosity for that polymer alone, in the absence of any of the other components of the electrostatic composition.

A certain monomer may be described herein as constituting a certain weight percentage of a polymer. This indicates that the repeating units formed from the said monomer in the polymer constitute said weight percentage of the polymer.

As used herein, "liquid electrostatic(ally) printing" or "liquid electrophotographic(ally) printing" generally refer to the process that provides an image that is transferred from a photo imaging substrate or plate either directly or indirectly via an intermediate transfer member to a print substrate, for example, a paper substrate. As such, the image is not substantially absorbed into the photo imaging substrate or plate on which it is applied. Additionally, "liquid electrophotographic printers" or "liquid electrostatic printers" generally refer to those printers capable of performing electrophotographic printing or electrostatic printing, as described above. A liquid electrophotographic (LEP) printing process may involve subjecting a liquid electrophotographic ink composition to an electric field, for example, an electric field having a field strength of 1000 V/cm or more, in some examples, 1000 V/mm or more.

As used herein, "LEP image" or "printed LEP image" refer to an image which has been printed, for example, on a print substrate, by liquid electrophotographically printing a LEP ink composition described herein.

As used herein, "NVS" is an abbreviation of the term "non-volatile solids".

As used herein, the term "about" is used to provide flexibility to a numerical range endpoint by providing that a given value may be a little above or a little below the endpoint. The degree of flexibility of this term can be dictated by the particular variable.

If a standard test is mentioned herein, unless otherwise stated, the version of the test to be referred to is the most recent at the time of filing this patent application.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not just the numerical values explicitly recited as the end points of the range, but also to include all the individual numerical values or sub-ranges encompassed within that range as if each numerical value and sub-range is explicitly recited. As an illustration, a numerical range of "about 1 wt % to about 5 wt %" should be interpreted to include not just the explicitly recited values of about 1 wt % to about 5 wt %, but also to include individual values and subranges within the indicated range. Thus, included in this numerical range are individual values such as 2, 3.5, and 4 and sub-ranges such as from 1-3, from 2-4, and from 3-5, and so on. This same principle applies to ranges reciting a single numerical value. Furthermore, such an interpretation should apply regardless of the breadth of the range or the characteristics being described.

As used herein, unless specified otherwise, wt % values are to be taken as referring to a weight-for-weight (w/w) percentage of solids in the ink composition, and not including the weight of any carrier fluid present.

Unless otherwise stated, any feature described herein can be combined with any aspect or any other feature described herein.

Herein is disclosed an electrostatic ink composition. The electrostatic ink composition may comprise:
 a carrier liquid; and
 chargeable particles suspended in the carrier liquid, wherein the chargeable particles comprise a thermoplastic resin formed from the reaction of a first resin and a second resin, wherein:
  the first resin comprises a polymer having acidic side groups; and
  the second resin comprises an epoxy resin component and an elastomeric component, wherein the epoxy resin component has one or more epoxide groups per molecule.

Herein is also disclosed a method for producing a liquid electrostatic ink composition. The method may comprise:
 suspending in a carrier liquid chargeable particles comprising a thermoplastic resin formed from the reaction of a first resin and a second resin, wherein:
  the first resin comprises a polymer having acidic side groups; and
  the second resin comprises an epoxy resin component and an elastomeric component, wherein the epoxy resin component has one or more epoxide groups per molecule.

Also disclosed herein is a method of producing a printed article. The method may comprise:
 applying an electrostatic ink composition to a substrate with a liquid electrostatic printer, wherein the electrostatic ink composition comprises:
  a thermoplastic resin formed from the reaction of a first resin and a second resin, wherein
  the first resin comprises a polymer having acidic side groups; and
  the second resin comprises an epoxy resin component and an elastomeric component, wherein the epoxy resin has one or more epoxide groups per molecule.

The present disclosure relates to a new electrostatic ink composition for use on a wide variety of substrates, in particular, a wide variety of types of paper, including coated papers, uncoated papers and gloss papers. Every substrate type has different surface properties, meaning that certain ink compositions may provide better adhesion to some substrates than to others. The electrostatic ink composition described herein provides improved adhesion to a wide variety of different substrates, particularly different paper types.

Electrostatic Ink Composition

The electrostatic ink composition may be a liquid electrostatic ink composition. The liquid electrostatic ink composition may comprise a carrier liquid and chargeable particles suspended in the carrier liquid.

The chargeable particles may comprise a thermoplastic resin. The thermoplastic resin may be formed from the reaction of a first resin and a second resin. The first resin may comprise a polymer having acidic side groups. The second resin may comprise an epoxy resin component and an elastomeric component.

In an example, the thermoplastic resin constitutes about 10 to 99%, in some examples, about 15 to 95%, by weight of the solids of the electrostatic ink composition. In another example, the thermoplastic resin constitutes about 20 to 95% by weight of the solids of the electrostatic ink composition. In another example, the thermoplastic resin constitutes about 25 to 95% by weight of the solids of electrostatic ink composition. In another example, the thermoplastic resin constitutes about 35 to 95% by weight, in some examples, from 75 to 95% by weight, of the solids of the electrostatic ink composition. In another example, the thermoplastic resin constitutes about 35 to 99% by weight, in some examples, from 75 to 99% by weight of the solids of the electrostatic ink composition.

In some examples, the first resin may constitute 99 wt % or less of the thermoplastic resin, in some examples, 98 wt % or less, in some examples, 97 wt % or less, in some examples, 96 wt % or less, in some examples, 95 wt % or less, in some examples, 94 wt % or less, in some examples, 93 wt % or less, in some examples, 92 wt % or less, in some examples, 91 wt % or less, in some examples, 90 wt % of the thermoplastic resin. In some examples, the first resin may constitute 60 wt % or more of the thermoplastic resin, in some examples, 65 wt % or more, in some examples, 70 wt % or more, in some examples, 75 wt % or more, in some examples, 80 wt % or more, in some examples, 85 wt % or more of the thermoplastic resin.

In some examples, the second resin may constitute 1 wt % or more of the thermoplastic resin, in some examples, 2 wt % or more, in some examples, 3 wt % or more, in some examples, 4 wt % or more, in some examples, 5 wt % or more, in some examples, 6 wt % or more, in some examples 7 wt % or more, in some examples, 8 wt % or more, in some examples, 9 wt % or more, in some examples 10 wt % of the thermoplastic resin. In some examples, the second resin may constitute 40 wt % or less of the thermoplastic resin, in some examples, 35 wt % or less, in some examples, 30 wt % or less, in some examples 25 wt % or less, in some examples, 20 wt % or less, in some examples 15 wt % or less of the thermoplastic resin.

First Resin

The first resin may comprise a polymer having acidic side groups. The first resin may comprise a mixture of polymers, at least one of which has acidic side groups. The first resin may comprise a mixture of polymers all of which have acidic side groups.

In some examples, the first resin may be a copolymer. In some examples, the first resin may be a mixture of copolymers.

In some examples, the first resin may comprise a polymer selected from ethylene acrylic acid copolymers; ethylene methacrylic acid copolymers; ethylene vinyl acetate copolymers; copolymers of ethylene (e.g., 80 wt % to 99.9 wt %), and alkyl (e.g., C1 to C5) ester of methacrylic or acrylic acid (e.g., 0.1 wt % to 20 wt %); copolymers of ethylene (e.g., 80 wt % to 99.9 wt %), acrylic or methacrylic acid (e.g., 0.1 wt % to 20.0 wt %) and alkyl (e.g., C1 to C5) ester of methacrylic or acrylic acid (e.g., 0.1 wt % to 20 wt %); ethylene ethyl acrylate; acrylic resins (e.g., copolymer of acrylic or methacrylic acid and at least one alkyl ester of acrylic or methacrylic acid wherein alkyl is, in some examples, from 1 to about 20 carbon atoms, such as methyl methacrylate (e.g., 50 wt % to 90 wt %)/methacrylic acid (e.g., 0 wt % to 20 wt %)/ethylhexylacrylate (e.g., 10 wt % to 50 wt %)); ethylene-acrylate terpolymers; ethylene-acrylic esters-maleic anhydride (MAH) or glycidyl methacrylate (GMA) terpolymers; ethylene-acrylic acid ionomers and combinations thereof.

The first resin comprises a polymer having acidic side groups. The polymer having acidic side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more, in some examples, an acidity of 90 mg KOH/g or more, in some examples, an acidity of 100 mg KOH/g or more, in some examples, an acidity of 105 mg KOH/g or more, in some examples, 110 mg KOH/g or more, in some examples, 115 mg KOH/g or more. The polymer having acidic side groups may have an acidity of 200 mg KOH/g or less, in some examples, 190 mg or less, in some examples, 180 mg or less, in some examples, 130 mg KOH/g or less, in some examples, 120 mg KOH/g or less. The acidity of a polymer, as measured in mg KOH/g, can be measured by using standard procedures known in the art, for example, the procedure described in ASTM D1386.

The first resin may comprise a polymer, in some examples, a polymer having acidic side groups, that has a melt flow rate of less than about 60 g/10 minutes, in some examples, about 50 g/10 minutes or less, in some examples, about 40 g/10 minutes or less, in some examples, 30 g/10 minutes or less, in some examples, 20 g/10 minutes or less, in some examples, 10 g/10 minutes or less. In some examples, all polymers having acidic side groups and/or ester groups in the first resin each individually have a melt flow rate of 90 g/10 minutes or less, in some examples, 80 g/10 minutes or less, in some examples, 80 g/10 minutes or less, in some examples, 70 g/10 minutes or less, in some examples, 70 g/10 minutes or less, in some examples, 60 g/10 minutes or less.

The polymer having acidic side groups can have a melt flow rate of about 10 g/10 minutes to about 120 g/10 minutes, in some examples, about 10 g/10 minutes to about 70 g/10 minutes, in some examples, about 10 g/10 minutes to about 40 g/10 minutes, in some examples, about 20 g/10 minutes to about 30 g/10 minutes. The polymer having acidic side groups can have a melt flow rate of, in some examples, about 50 g/10 minutes to about 120 g/10 minutes, in some examples, about 60 g/10 minutes to about 100 g/10 minutes. The melt flow rate can be measured by using standard procedures known in the art, for example, as described in ASTM D1238.

The acidic side groups may be in free acid form or may be in the form of an anion and associated with at least one counterion, typically metal counterions, for example, a metal selected from the alkali metals, such as lithium, sodium and potassium, alkali earth metals, such as magnesium or calcium, and transition metals, such as zinc. The polymer having acidic side groups can be selected from polymers such as copolymers of ethylene and an ethylenically unsaturated acid of either acrylic acid or methacrylic acid; and ionomers thereof, such as methacrylic acid and ethylene-acrylic or methacrylic acid copolymers which are at least partially neutralized with metal ions (e.g., Zn, Na, Li) such as SURLYN® ionomers. The polymer comprising acidic side groups can be a copolymer of ethylene and an ethylenically unsaturated acid of either acrylic or methacrylic acid, where the ethylenically unsaturated acid of either acrylic or methacrylic acid constitutes from 5 wt % to about 25 wt % of the copolymer, in some examples, from 10 wt % to about 20 wt % of the copolymer.

The first resin may comprise two different polymers having acidic side groups. The two polymers having acidic side groups may have different acidities, which may fall within the ranges mentioned above. The first resin may comprise a first polymer having acidic side groups that has an acidity of from 50 mg KOH/g to 110 mg KOH/g and a second polymer having acidic side groups that has an acidity of 110 mg KOH/g to 130 mg KOH/g.

The first resin may comprise two different polymers having acidic side groups: a first polymer having acidic side groups that has a melt flow rate of about 10 g/10 minutes to about 50 g/10 minutes and an acidity of from 50 mg KOH/g to 110 mg KOH/g, and a second polymer having acidic side groups that has a melt flow rate of about 50 g/10 minutes to about 120 g/10 minutes and an acidity of 110 mg KOH/g to 130 mg KOH/g. The first and second polymers may be absent of ester groups.

The first resin may comprise two different polymers having acidic side groups: a first polymer that is a copolymer of ethylene (e.g., 92 to 85 wt %, in some examples, about 89 wt %) and acrylic or methacrylic acid (e.g., 8 to 15 wt %, in some examples, about 11 wt %) having a melt flow rate of 80 to 110 g/10 minutes and a second polymer that is a co-polymer of ethylene (e.g., about 80 to 92 wt %, in some examples, about 85 wt %) and acrylic acid (e.g., about 18 to 12 wt %, in some examples, about 15 wt %) having a melt viscosity lower than that of the first polymer, the second polymer, for example, having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. Melt viscosity can be measured by using standard techniques. The melt viscosity can be measured by using a rheometer, for example, a commercially available AR-2000 Rheometer from Thermal Analysis Instruments, by using the geometry of: 25 mm steel plate-standard steel parallel plate, and finding the plate over plate rheometry isotherm at 120° C., 0.01 Hz shear rate.

In any of the polymers mentioned above (that is, the polymers of the first resin), the ratio of the first polymer having acidic side groups to the second polymer having acidic side groups can be from about 10:1 to about 2:1. In another example, the ratio can be from about 6:1 to about 3:1, in some examples, about 4:1.

The first resin may comprise a polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; said polymer may be a polymer having acidic side groups as described herein. The first resin may comprise a first polymer having a melt viscosity of 15000 poise or more, in some examples, 20000 poise or more, in some examples, 50000 poise or more, in some examples, 70000 poise or more; and in some examples, the first resin may comprise a second polymer having a melt viscosity less than the first polymer, in some examples, a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less. The first resin may comprise a first polymer having a melt viscosity of 60000 poise or more, in some examples, from 60000 poise to 100000 poise, in some examples, from 65000 poise to 85000 poise; a second polymer having a melt viscosity of from 15000 poise to 40000 poise, in some examples, 20000 poise to 30000 poise, and a third polymer having a melt viscosity of 15000 poise or less, in some examples, a melt viscosity of 10000 poise or less, in some examples, 1000 poise or less, in some examples, 100 poise or less, in some examples, 50 poise or less, in some examples, 10 poise or less; an example of the first polymer is NUCREL® 960 (from DUPONT™), and an example of the second polymer is NUCREL® 699 (from DUPONT™), and an example of the third polymer is AC-5120 (from Honeywell). The first, second and third polymers may be polymers having acidic side groups as described herein. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

If the first resin comprises a single type of polymer, the polymer (excluding any other components of the electrostatic ink composition) may have a melt viscosity of 6000 poise or more, in some examples, a melt viscosity of 8000 poise or more, in some examples, a melt viscosity of 10000 poise or more, in some examples, a melt viscosity of 12000 poise or more. If the first resin comprises a plurality of polymers all the polymers of the first resin may together form a mixture (excluding any other components of the electrostatic ink composition) that has a melt viscosity of 6000 poise or more, in some examples, a melt viscosity of 8000 poise or more, in some examples, a melt viscosity of 10000 poise or more, in some examples, a melt viscosity of 12000 poise or more. Melt viscosity can be measured by using standard techniques. The melt viscosity can be measured by using a rheometer, for example, a commercially available AR-2000 Rheometer from Thermal Analysis Instruments, using the geometry of: 25 mm steel plate-standard steel parallel plate, and finding the plate over plate rheometry isotherm at 120° C., 0.01 Hz shear rate.

The first resin may comprise two different polymers having acidic side groups that are selected from copolymers of ethylene and an ethylenically unsaturated acid of either methacrylic acid or acrylic acid; and ionomers thereof, such as methacrylic acid and ethylene-acrylic or methacrylic acid copolymers which are at least partially neutralized with metal ions (e.g., Zn, Na, Li) such as SURLYN® ionomers. The first resin may comprise (i) a first polymer that is a copolymer of ethylene and an ethylenically unsaturated acid of either acrylic acid or methacrylic acid, wherein the ethylenically unsaturated acid of either acrylic or methacrylic acid constitutes from 8 wt % to about 16 wt % of the copolymer, in some examples, 10 wt % to 16 wt % of the copolymer; and (ii) a second polymer that is a copolymer of ethylene and an ethylenically unsaturated acid of either acrylic acid and methacrylic acid, wherein the ethylenically unsaturated acid of either acrylic or methacrylic acid constitutes from 12 wt % to about 30 wt % of the copolymer, in some examples, from 13 wt % to about 20 wt % of the copolymer, in some examples, from 14 wt % to about 18 wt % of the copolymer, in some examples, from 14 wt % to 16 wt % of the copolymer.

The first resin may comprise a polymer having acidic side groups, as described above (which may be free of ester side groups), and a polymer having ester side groups. The polymer having ester side groups may further comprise acidic side groups. The polymer having ester side groups may be a co-polymer of a monomer having ester side groups and a monomer having acidic side groups. The polymer may be a co-polymer of a monomer having ester side groups, a monomer having acidic side groups, and a monomer absent of any acidic and ester side groups. The monomer having ester side groups may be a monomer selected from esterified acrylic acid or esterified methacrylic acid. The monomer having acidic side groups may be a monomer selected from acrylic or methacrylic acid. The monomer absent of any acidic and ester side groups may be an alkylene monomer, including, but not limited to, ethylene or propylene. The esterified acrylic acid or esterified methacrylic acid may, respectively, be an alkyl ester of acrylic acid or an alkyl ester of methacrylic acid. The alkyl group in the alkyl ester of acrylic or methacrylic acid may be an alkyl group having 1 to 30 carbon atoms, in some examples, 1 to 20 carbon atoms, in some examples, 1 to 10 carbon atoms; in some examples, selected from methyl, ethyl, iso-propyl, n-propyl, t-butyl, iso-butyl, n-butyl and pentyl.

The polymer having ester side groups may be a co-polymer of a first monomer having ester side groups, a second monomer having acidic side groups and a third monomer which is an alkylene monomer absent of any acidic and ester side groups. The polymer having ester side groups may be a co-polymer of (i) a first monomer having ester side groups selected from esterified acrylic acid or esterified methacrylic acid, in some examples, an alkyl ester of acrylic or methacrylic acid, (ii) a second monomer having acidic side groups selected from acrylic or methacrylic acid and (iii) a third monomer which is an alkylene monomer selected from ethylene and propylene. The first monomer may constitute 1 to 50% by weight of the co-polymer, in some examples, 5 to 40% by weight, in some examples, 5 to 20% by weight of the copolymer, in some examples, 5 to 15% by weight of the copolymer. The second monomer may constitute 1 to 50% by weight of the co-polymer, in some examples, 5 to 40% by weight of the co-polymer, in some examples, 5 to 20% by weight of the co-polymer, in some examples, 5 to 15% by weight of the copolymer. In an example, the first monomer constitutes 5 to 40% by weight of the co-polymer, and the second monomer constitutes 5 to 40% by weight of the co-polymer, with the third monomer constituting the remaining weight of the copolymer. In an example, the first monomer constitutes 5 to 15% by weight of the co-polymer, and the second monomer constitutes 5 to 15% by weight of the co-polymer, with the third monomer constituting the remaining weight of the copolymer. In an example, the first monomer constitutes 8 to 12% by weight of the co-polymer, and the second monomer constitutes 8 to 12% by weight of the co-polymer, with the third monomer constituting the remaining weight of the copolymer. In an example, the first monomer constitutes about 10% by weight of the co-polymer and the second monomer constitutes about 10% by weight of the co-polymer, with the third monomer constituting the remaining weight of the copolymer. The polymer having ester side groups may be selected from the BYNEL® class of monomer, including BYNEL® 2022 and BYNEL® 2002, which are available from DUPONT™.

The polymer having ester side groups may constitute 1% or more by weight of the total amount of the polymers in the first resin, for example, the total amount of the polymer or polymers having acidic side groups and polymer having ester side groups. The polymer having ester side groups may constitute 5% or more by weight of the total amount of the polymers in the first resin, in some examples, 8% or more by weight of the total amount of the polymers in the first resin, in some examples, 10% or more by weight of the total amount of the polymers in the first resin, in some examples, 15% or more by weight of the total amount of the polymers in the first resin, in some examples, 20% or more by weight of the total amount of the polymers in the first resin, in some examples, 25% or more by weight of the total amount of the polymers in the first resin, in some examples, 30% or more by weight of the total amount of the polymers in the first resin, in some examples, 35% or more by weight of the total amount of the polymers in the first resin. The polymer having ester side groups may constitute from 5 to 50% by weight of the total amount of the polymers in the first resin, in some examples, 10 to 40% by weight of the total amount of the polymers in the first resin, in some examples, 15 to 30% by weight of the total amount of the polymers in the first resin.

The polymer having ester side groups may have an acidity of 50 mg KOH/g or more, in some examples, an acidity of 60 mg KOH/g or more, in some examples, an acidity of 70 mg KOH/g or more, in some examples, an acidity of 80 mg KOH/g or more. The polymer having ester side groups may have an acidity of 100 mg KOH/g or less, in some examples, 90 mg KOH/g or less. The polymer having ester side groups may have an acidity of 60 mg KOH/g to 90 mg KOH/g, in some examples, 70 mg KOH/g to 80 mg KOH/g.

The polymer having ester side groups may have a melt flow rate of about 10 g/10 minutes to about 120 g/10 minutes, in some examples, about 10 g/10 minutes to about 50 g/10 minutes, in some examples, about 20 g/10 minutes to about 40 g/10 minutes, in some examples, about 25 g/10 minutes to about 35 g/10 minutes.

In an example, the polymer or polymers of the first resin can be selected from the NUCREL® family of polymers (e.g., NUCREL® 403™, NUCREL® 407™, NUCREL® 609HS™, NUCREL® 908HS™, NUCREL® 1202HC™, NUCREL® 30707™, NUCREL® 1214™, NUCREL® 903™, NUCREL® 3990™, NUCREL® 910™, NUCREL® 925™, NUCREL® 699™, NUCREL® 599™, NUCREL® 960™, NUCREL® RX 76™, NUCREL® 2806™, BYNEL® 2002, BYNEL® 2014, and BYNEL® 2020 (sold by E. I. du PONT)), the ACLYN® family of polymers (e.g., ACLYN® 201, ACLYN® 246, ACLYN® 285, and ACLYN® 295), and the LOTADER® family of polymers (e.g., LOTADER® 2210, LOTADER® 3430, and LOTADER® 8200 (sold by Arkema)).

Second Resin

The second resin may comprise an epoxy resin component and an elastomeric component. The second resin may comprise an epoxy resin component and an elastomeric component, wherein the epoxy resin component has one or more epoxide groups per molecule.

In some examples, the second resin may comprise a mixture of an epoxy resin component and an elastomeric component. In some examples, the second resin may comprise a reaction product of an epoxy resin component and an elastomeric component. In some examples, the second resin may comprise a copolymer of an epoxy resin component and an elastomeric component. In some examples, the second resin may comprise a block copolymer of an epoxy resin component and an elastomeric component. In some examples, the second resin may comprise a block copolymer of an epoxy resin component and an elastomeric component, wherein the epoxy resin component forms a block of the block copolymer and the elastomeric component forms another block of the block copolymer. In some examples, the second resin may comprise a graft copolymer of an epoxy resin component and an elastomeric component. In some examples, the second resin may comprise a graft copolymer of an epoxy resin component and an elastomeric component, wherein either the epoxy resin component is grafted onto the elastomeric component, or the elastomeric resin component is grafted onto the epoxy resin component.

In some examples, the second resin may comprise 1 wt % or more elastomeric component, in some example, 2 wt % or more elastomeric component, in some examples, 3 wt % or more elastomeric component, in some examples, 4 wt % or more elastomeric component, in some examples, 5 wt % or more elastomeric component.

In some examples, the second resin may comprise 30 wt % or less elastomeric component, in some examples, 25 wt % or less elastomeric component, in some examples, 22 wt % or less elastomeric component, in some examples, 20 wt % or less elastomeric component.

In some examples, the second resin may comprise from 1 wt % to 30 wt % elastomeric component, in some examples 2 wt % to 25 wt % elastomeric component, in some examples 5 wt % to 25 wt % elastomeric component, in some examples 5 wt % to 20 wt % elastomeric component.

In some examples, the second resin may comprise a thermoplastic polyurethane as the elastomeric component in an amount of 30 wt % or less, in some examples, 25 wt % or less, in some examples 22 wt % or less, in some examples, 20 wt % or less, in some examples, 18 wt % or less, in some examples, 15 wt % or less, in some examples, 13 wt % or less.

In some examples, the second resin may comprise a thermoplastic polyurethane as the elastomeric component in an amount of from 1 wt % to 30 wt %, in some examples 2 wt % to 25 wt %, in some examples 5 wt % to 25 wt %, in some examples 5 wt % to 20 wt %.

Epoxy Resin Component

In some examples, the epoxy resin component may comprise one or more epoxide groups per molecule. In some examples, the epoxy resin component may comprise two or more epoxide groups per molecule.

In some examples, the epoxy resin component may comprise a copolymer of a polyhydric alcohol monomer and an epoxide-containing monomer. In some examples, the epoxy resin component may comprise an epoxy resin preparable from (e.g., preparable by the polymerisation of) a polyhydric alcohol monomer and an epoxide-containing monomer.

In some examples, the epoxide-containing monomer comprises an epihalohydrin or a β-methylepihalohydrin. In some examples, the epoxide-containing monomer comprises a β-methylepihalohydrin. In some examples, the epoxide-containing monomer comprises an epihalohydrin. In some examples, the epoxide-containing monomer comprises epichlorohydrin.

In some examples, the polyhydric alcohol monomer comprises a polyhydric phenol. In some examples, the polyhydric alcohol monomer comprises a dihydric alcohol. In some examples, the polyhydric alcohol monomer comprises a dihydric phenol. In some examples, the dihydric phenol monomer may comprise a bisphenol-type monomer. In some examples, the dihydric phenol monomer may comprise 2,2-bis(4-hydroxyphenyl)propane (bisphenol A), 1,1-bis(4-hydroxyphenyl)-1-phenylethane (bisphenol AP), 2,2-bis(4-hydroxyphenyl)hexafluoropropane (bisphenol AF), 2,2-bis(4-hydroxyphenyl)butane (bisphenol B), bis(4-hydroxyphenyl)diphenylmethane (bisphenol BP), 2,2-bis(3-methyl-4-hydroxyphenyl)propane (bisphenol C), bis(4-hydroxyphenyl)-2,2-dichlorethylene (bisphenol C2), 1,1-bis(4-hydroxyphenyl)ethane (bisphenol E), bis(4-hydroxyphenyl)methane (bisphenol F), 2,2-bis(4-hydroxy-3-isopropylphenyl)-propane (bisphenol G), 1,3-bis[2-(4-hydroxyphenyl)-2-propyl]benzene (bisphenol M), bis(4-hydroxyphenyl)sulfone (bisphenol S), 1,4-bis[2-(4-hydroxyphenyl)-2-propyl]-benzene (bisphenol P), 5,5'-(1-methylethyliden)-bis[1,1'-(bisphenyl)-2-ol]propane (bisphenol PH), 1,1-bis(4-hydroxyphenyl)-3,3,5-trimethylcyclohexane (bisphenol TMC), 1,1-bis(4-hydroxyphenyl)cyclohexane (bisphenol Z), 1,1-bis(4-hydroxyphenyl)ethane (bisphenol AD), or bis(4-hydroxyphenyl)ether, as well as hydrogenated compounds thereof. In some examples, the dihydric phenol monomer may comprise 2,2-bis(4-hydroxyphenyl)propane (bisphenol A) or bis(4-hydroxyphenyl)methane (bisphenol F).

In some examples, the epoxy resin component may comprise a polymer containing epoxide side groups. In some examples, the epoxy resin component may comprise a phenolic resin containing epoxide side groups. In some examples, the epoxy resin component may comprise a phenol-formaldehyde resin containing epoxide side groups. In some examples, the epoxy resin component may comprise an epoxidised novolac resin. In some examples, the epoxy resin component may comprise an epoxidised phenol novolac resin or an epoxidised cresol novolac resin.

In some examples, the epoxy resin component may comprise an alkyl glycol diglycidyl ether. The alkyl glycol diglycidyl ether may have the formula:

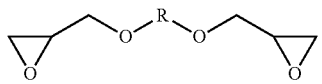

wherein R is an alkylene group. The alkylene group may be a group having 1 to 10 carbon atoms. The alkylene group may be a branched, straight-chain or cyclic alkylene group, for example, having 2 to 10 carbon atoms, in some examples, 3 to 10 carbon atoms, in some examples, 3 to 8 carbon atoms, in some examples, 4 to 6 carbon atoms. The alkylene group may be a branched alkylene group having, for example, 4 to 6 carbon atoms. In some examples, the epoxy resin component comprises neopentyl glycol diglycidyl ether.

Elastomeric Component

In some examples, the elastomeric component may comprise a thermoplastic polyurethane or a butadiene-acrylonitrile elastomer. In some examples, the elastomeric component may comprise a thermoplastic polyurethane. In some examples, the elastomeric component may comprise a butadiene-acrylonitrile elastomer.

A thermoplastic polyurethane comprises a polymer derived from a polyisocyanate and a polyol. In some examples, the thermoplastic polyurethane comprises a polymer derived from a diisocyanate and a diol. In some examples, the thermoplastic polyurethane comprises a polymer derived from a diisocyanate, a short-chain diol (also referred to as a chain extender) and a long-chain diol.

In some examples, the polyisocyanate may be a diisocyanate or a triisocyanate, or a mixture thereof. In some examples, the polyisocyanate is a diisocyanate. In some examples, the diisocyanate may be an aromatic diisocyanate or an aliphatic diisocyanate. In some examples, the aromatic diisocyanate comprises a bis(phenyl isocyanate) or a phenyl diisocyanate. In some examples, the aromatic diisocyanate may be selected from a methylene bis(phenyl isocyanate) (MDI; for example, 2,2'-MDI, 2,4'-MDI or 4,4'-MDI, or mixtures thereof), a toluene diisocyanate (TDI; for example, 2,4-TDI or 2,6-TDI, or mixtures thereof), xylylene diisocyanate (XDI; for example, m-xylylene diisocyanate), phenylene diisocyanate (for example, 1,4-phenylene diisocyanate, 1,3-phenylene diisocyanate), naphthalene diisocyanate (for example, 1,5-naphthalene diisocyanate), diphenylmethane-3,3'-dimethoxy-4,4'-diisocyanate (TODI) or a mixture thereof. In some examples, the aliphatic diisocyanate comprises an isophorone diisocyanate (IPDI), cyclohexyl diisocyanate (CHDI, for example, 1,4-cyclohexyl diisocyanate), decane-1,10-diisocyanate, hexamethylene diisocyanate (HDI), bis(isocyanatomethyl)cyclohexane (CHMDI), dicyclohexylmethane-4,4'-diisocyanate (HMDI) or a mixture thereof. In some examples, the diisocyanate comprises 4,4'-MDI or 2,4-TDI.

In some examples, the polyol may be a diol or a triol or a mixture thereof. In some examples, the polyol may be a diol. In some examples, the diol may be a mixture of a long-chain diol and a short-chain diol.

The long-chain diol may be a polymeric diol. In some examples, the long-chain diols may be polyester diols, polyether diols or polycaprolactone diols, or combinations thereof. In some examples, the long-chain diol may comprise a combination of polyethers and polyesters.

In some examples, the long-chain diols may be polyether polyols. In some examples, the polyether diol may comprise a poly(oxypropylene) diol or a poly(oxytetramethylene) diol.

In some examples, the long-chain diols may be polyester diols.

The polyester diol may be formed from at least one dialkylene glycol and at least one dicarboxylic acid, or an ester or anhydride thereof. The polyester diol may contain 2 terminal hydroxyl groups, optionally, 2 primary hydroxyl groups, or the polyester diol may include at least one terminal hydroxyl group, and in some embodiments, at least one terminal hydroxyl group and one or more carboxylic acid groups. The polyester polyol may be a substantially linear, or linear, polyester, which may have a number average molecular weight ($M_n$) in the range of from about 500 to about 10,000, from about 600 to about 4000, from about 600 to about 3000, from about 800 to about 3000, from about 1000 to about 2500, or from about 1200 to about 2500. In some examples, the polyester diol will have a number average molecular weight in the range of from about 1500 to about 2500.

The polyester diol may be an adipate, a polycaprolactone, a polycarbonate or an aliphatic polycarbonate.

The short-chain diol, which is often termed a chain-extender, may have a molecular weight in the range of from 48 to about 400 or from 61 to about 400.

Suitable short-chain diols include glycols and can be aliphatic, aromatic or combinations thereof. In some cases, the short-chain diols are glycols having from 2 to about 20 carbon atoms. In some examples, the glycols are lower aliphatic or short-chain glycols having from about 4 to about 12 carbon atoms and include, for example, diethylene glycol, dipropylene glycol, 1,4-butane diol, 1,6-hexanediol, 1,3-butanediol, 1,5-pentanediol, 1,4-cyclohexanedimethanol, neopentyl glycol, 1,9-nonanediol, 1,12-dodecanediol and the like. In some examples, the short-chain diol is comprised solely of 1,6-hexanediol.

In some examples, the short-chain diol may comprise an aromatic glycol. In some examples, the aromatic glycol may be benzene glycol or xylene glycol. Xylene glycol may be a mixture of 1,4-di(hydroxymethyl)benzene and 1,2-di(hydroxymethyl)benzene. The benzene glycol may be hydroquinone bis(β-hydroxyethyl)ether (HQEE), 1,3-di(2-hydroxyethyl)benzene, 1,2-di(2-hydroxyethoxy)benzene, or combinations thereof.

In some examples, the elastomeric component may comprise a butadiene-acrylonitrile elastomer. In some examples, the butadiene-acrylonitrile elastomer is a carboxy-terminated butadiene-acrylonitrile elastomer.

In some examples, the butadiene-acrylonitrile elastomer is prepared from butadiene and acrylonitrile monomers. In some examples, the butadiene-acrylonitrile elastomer is prepared from butadiene and acrylonitrile monomers in a ratio of 90:10 to 50:50, in some examples, 85:15 to 55:45, in some examples, 80:20 to 60:40, in some examples, in some examples, 75:25 to 70:30, in some examples, 75:25 to 73:27. In some examples, the butadiene-acrylonitrile is prepared from the butadiene and acrylonitrile monomers in a ratio of 74:26. In some examples, the butadiene-acrylonitrile elastomer comprises 10 wt % or more, in some examples, 15 wt % or more, in some examples, 20 wt % or more, in some examples 25 wt % or more acrylonitrile monomers and the remaining weight may comprise butadiene monomers. In some examples, the butadiene-acrylonitrile elastomer comprises at least 50 wt %, in some examples, at least 55 wt %, in some examples, at least 60 wt %, in some examples, at least 65 wt % butadiene monomers and the remaining weight may comprise acrylonitrile monomers.

Liquid Carrier

In some examples, for example, when printing, the electrostatic ink composition comprises a liquid carrier. Generally, the liquid carrier can act as a dispersing medium for the other components in the electrostatic ink composition. For example, the liquid carrier can comprise or be a hydrocarbon, silicone oil, vegetable oil, or the like. The liquid carrier can include, but is not limited to, an insulating, non-polar, non-aqueous liquid that can be used as a medium for toner particles. The liquid carrier can include compounds that have a resistivity in excess of about $10^9$ ohm·cm. The liquid carrier may have a dielectric constant below about 5, in some examples, below about 3. The liquid carrier can include, but is not limited to, hydrocarbons. The hydrocarbon can include, but is not limited to, an aliphatic hydrocarbon, an isomerized aliphatic hydrocarbon, a branched chain aliphatic hydrocarbon, an aromatic hydrocarbon, and combinations thereof. Examples of the liquid carrier include, but are not limited to, aliphatic hydrocarbons, isoparaffinic compounds, paraffinic compounds, dearomatized hydrocarbon compounds, and the like. In particular, the liquid carrier can include, but is not limited to, ISOPAR-G™, ISOPAR-H™, ISOPAR-L™, ISOPAR-M™, ISOPAR-K™, ISOPAR-V™, NORPAR 12™, NORPAR 13™, NORPAR 15™, EXXOL D40™, EXXOL D80™, EXXOL D100™, EXXOL D130™, and EXXOL D140™ (each sold by EXXON CORPORATION); TECLEN N-16™, TECLEN N-20™, TECLEN N-22™, NISSEKI NAPHTHESOL L™, NISSEKI NAPHTHESOL M™, NISSEKI NAPHTHESOL H™, #0 SOLVENT L™, #0 SOLVENT M™, #0 SOLVENT H™, NISSEKI ISOSOL 300™, NISSEKI ISOSOL 400™, AF-4™, AF-5™, AF-6™ and AF-7™ (each sold by NIPPON OIL CORPORATION); IP SOLVENT 1620™ and IP SOLVENT 2028™ (each sold by IDEMITSU PETROCHEMICAL CO., LTD.); AMSCO OMS™ and AMSCO 460™ (each sold by AMERICAN MINERAL SPIRITS CORP.); and ELECTRON™, POSITRON™, NEW II™, PUROGEN™ HF (100% synthetic terpenes) (sold by ECOLINK™).

Before electrostatic printing, the liquid carrier can constitute about 20% to 99.5% by weight of the electrostatic ink composition, in some examples, 50% to 99.5% by weight of the electrostatic ink composition. Before printing, the liquid carrier may constitute about 40 to 90% by weight of the electrostatic ink composition. Before printing, the liquid carrier may constitute about 60% to 80% by weight of the electrostatic ink composition. Before printing, the liquid carrier may constitute about 90% to 99.5% by weight of the electrostatic ink composition, in some examples, 95% to 99% by weight of the electrostatic ink composition.

The electrostatic ink, when electrostatically printed, may be substantially free from liquid carrier. In an electrostatic printing process and/or afterwards, the liquid carrier may be removed, for example, by an electrophoresis processes during printing and/or evaporation, such that substantially just solids are transferred to the print substrate. Substantially free from liquid carrier may indicate that the ink printed on the print substrate contains less than 5 wt % liquid carrier, in some examples, less than 2 wt % liquid carrier, in some examples, less than 1 wt % liquid carrier, in some examples, less than 0.5 wt % liquid carrier. In some examples, the ink printed on the print substrate is free from liquid carrier.

Charge Director

In some examples, the electrostatic ink composition includes a charge director.

The charge director may be added in order to impart and/or maintain sufficient electrostatic charge on ink particles during electrostatic printing, which may be chargeable particles comprising a thermoplastic resin formed from the reaction of a first resin and a second resin. The charge director may comprise ionic compounds, particularly metal salts of fatty acids, metal salts of sulfo-succinates, metal salts of oxyphosphates, metal salts of alkyl-benzenesulfonic acid, metal salts of aromatic carboxylic acids or sulfonic acids, as well as zwitterionic and non-ionic compounds, such as polyoxyethylated alkylamines, lecithin, polyvinylpyrrolidone, organic acid esters of polyvalent alcohols, and the like. The charge director can be selected from, but is not limited to, oil-soluble petroleum sulfonates (e.g., neutral Calcium PETRONATE™, neutral Barium PETRONATE™, and basic Barium PETRONATE™), polybutylene succinimides (e.g., OLOA™ 1200 and Amoco 575), and glyceride salts (e.g., sodium salts of phosphated mono- and diglycerides with unsaturated and saturated acid substituents), sulfonic acid salts including, but not limited to, barium, sodium, calcium, and aluminium salts of sulfonic acid. The sulfonic acids may include, but are not limited to, alkyl sulfonic acids, aryl sulfonic acids, and sulfonic acids of alkyl succinates. The charge director can impart a negative charge or a positive charge on the chargeable particles of an electrostatic ink composition.

In some examples, the electrostatic ink composition comprises a charge director comprising a simple salt. Simple salts are salts that do not form micelles by themselves, although they may form a core for micelles with a micelle forming salt. The ions constructing the simple salts are all hydrophilic. The simple salt may include a cation selected from the group consisting of Mg, Ca, Ba, $NH_4$, tert-butyl ammonium, Lit, and $Al^{3+}$, or from any sub-group thereof. The simple salt may include an anion selected from the group consisting of $SO_4^{2-}$, $PO^{3-}$, $NO^{3-}$, $HPO_4^{2-}$, $CO_3^{2-}$, acetate, trifluoroacetate (TFA), $Cl^-$, $BF_4^-$, $F^-$, $ClO_4^-$, and $TiO_3^{4-}$, or from any sub-group thereof. The simple salt may be selected from $CaCO_3$, $Ba_2TiO_3$, $Al_2(SO_4)$, $Al(NO_3)_3$, $Ca_3(PO_4)_2$, $BaSO_4$, $BaHPO_4$, $Ba_2(PO_4)_3$, $CaSO_4$, $(NH_4)_2CO_3$, $(NH_4)_2SO_4$, $NH_4OAc$, tert-butyl ammonium bromide, $NH_4NO_3$, LiTFA, $Al_2(SO_4)_3$, $LiClO_4$ and $LiBF_4$, or any sub-group thereof.

The charge director may include at least one of (i) soya lecithin, (ii) a barium sulfonate salt, such as basic barium petronate (BPP), and (iii) an isopropyl amine sulfonate salt. Basic barium petronate is a barium sulfonate salt of a C21-26 hydrocarbon alkyl, and can be obtained, for example, from Chemtura. An example isopropyl amine sulfonate salt is dodecyl benzene sulfonic acid isopropyl amine, which is available from Croda.

In some examples, the electrostatic ink composition comprises a charge director comprising a sulfosuccinate salt of the general formula $MA_n$, wherein M is a metal, n is the valence of M, and A is an ion of the general formula (I):

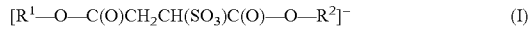

$$[R^1\text{—}O\text{—}C(O)CH_2CH(SO_3)C(O)\text{—}O\text{—}R^2]^- \quad (I)$$

wherein each of $R^1$ and $R^2$ is an alkyl group.

The sulfosuccinate salt of the general formula $MA_n$ is an example of a micelle forming salt. The charge director may be substantially free of or free of an acid of the general formula HA, where A is as described above. The charge director may include micelles of said sulfosuccinate salt enclosing at least some of the nanoparticles. The charge director may include at least some nanoparticles having a size of 200 nm or less, and/or, in some examples, 2 nm or more.

In the formula $[R^1\text{—}O\text{—}C(O)CH_2CH(SO_3^-)C(O)\text{—}O\text{—}R^2]$, in some examples, each of $R^1$ and $R^2$ is an aliphatic alkyl group. In some examples, each of $R^1$ and $R^2$ independently is a C6-25 alkyl. In some examples, said aliphatic alkyl group is linear. In some examples, said aliphatic alkyl group is branched. In some examples, said aliphatic alkyl group includes a linear chain of more than 6 carbon atoms. In some examples, $R^1$ and $R^2$ are the same. In some examples, at least one of $R^1$ and $R^2$ is $C_{13}H_{27}$. In some examples, M is Na, K, Cs, Ca, or Ba.

In some examples, the charge director constitutes about 0.001 to 20% by weight, in some examples, 0.01 to 20% by weight, in some examples, 0.01 to 10% by weight, in some examples, 0.01 to 1% by weight of the solids of the electrostatic ink composition. In some examples, the charge director constitutes about 0.001 to 0.15% by weight of the solids of the electrostatic ink composition, in some examples, 0.001 to 0.15%, in some examples, 0.001 to 0.02% by weight of the solids of the electrostatic ink composition, in some examples, 0.1 to 2% by weight of the solids of the electrostatic ink composition, in some examples, 0.2 to 1.5% by weight of the solids of the electrostatic ink composition, in some examples, 0.1 to 1% by weight of the solids of the electrostatic ink composition, in some examples, 0.2 to 0.8% by weight of the solids of the electrostatic ink composition. In some examples, the charge director is present in an amount of at least 1 mg of charge director per gram of solids of the electrostatic ink composition (which will be abbreviated to mg/g), in some examples, at least 2 mg/g, in some examples, at least 3 mg/g, in some examples, at least 4 mg/g, in some examples, at least 5 mg/g. In some examples, the charge director is present in an amount of from 1 mg to 50 mg of charge director per gram of solids of the electrostatic ink composition (which will be abbreviated to mg/g), in some examples, from 1 mg/g to 25 mg/g, in some examples, from 1 mg/g to 20 mg/g, in some examples, from 1 mg/g to 15 mg/g, in some examples, from 1 mg/g to 10 mg/g, in some examples, from 3 mg/g to 20 mg/g, in some examples, from 3 mg/g to 15 mg/g, in some examples, from 5 mg/g to 10 mg/g.

Charge Adjuvant

In some examples, the electrostatic ink composition includes a charge adjuvant.

A charge adjuvant may promote charging of the chargeable particles when a charge director is present in the electrostatic ink composition during printing. The charge adjuvant can include, but is not limited to, barium petronate, calcium petronate, Co salts of naphthenic acid, Ca salts of naphthenic acid, Cu salts of naphthenic acid, Mn salts of naphthenic acid, Ni salts of naphthenic acid, Zn salts of naphthenic acid, Fe salts of naphthenic acid, Ba salts of stearic acid, Co salts of stearic acid, Pb salts of stearic acid, Zn salts of stearic acid, Al salts of stearic acid, Zn salts of stearic acid, Cu salts of stearic acid, Pb salts of stearic acid, Fe salts of stearic acid, metal carboxylates (e.g., Al tristearate, Al octanoate, Li heptanoate, Fe stearate, Fe distearate, Ba stearate, Cr stearate, Mg octanoate, Ca stearate, Fe naphthenate, Zn naphthenate, Mn heptanoate, Zn heptanoate, Ba octanoate, Al octanoate, Co octanoate, Mn octanoate, and Zn octanoate), Co lineolates, Mn lineolates, Pb lineolates, Zn lineolates, Ca oleates, Co oleates, Zn palmirate, Ca resinates, Co resinates, Mn resinates, Pb resinates, Zn resinates, AB diblock copolymers of 2-ethylhexyl methacrylate-co-methacrylic acid calcium and ammonium salts, copolymers of an alkyl acrylamidoglycolate alkyl ether (e.g., methyl acrylamidoglycolate methyl ether-co-vinyl acetate), and hydroxy bis(3,5-di-tert-butyl salicylic) aluminate monohydrate. In an example, the charge adjuvant is or includes aluminium di- or tristearate. The charge adjuvant may be present in an amount of about 0.1 to 5% by weight, in some examples, about 0.1 to 1% by weight, in some examples, about 0.3 to 0.8% by weight of the solids of the electrostatic ink composition, in some examples, about 1 to 3% by weight of the solids of the electrostatic ink composition, in some examples, about 1.5 to 2.5% by weight of the solids of the electrostatic ink composition.

In some examples, the electrostatic ink composition further includes, for example, as a charge adjuvant, a salt of a multivalent cation and a fatty acid anion. The salt of a multivalent cation and a fatty acid anion can act as a charge adjuvant. The multivalent cation may, in some examples, be a divalent or a trivalent cation. In some examples, the multivalent cation is selected from Group 2, transition metals, Group 3 and Group 4 in the Periodic Table. In some examples, the multivalent cation includes a metal selected from Ca, Sc, Ti, V, Cr, Mn, Fe, Co, Ni, Cu, Zn, Al and Pb. In some examples, the multivalent cation is $Al^{3+}$. The fatty acid anion may be selected from a saturated or unsaturated fatty acid anion. The fatty acid anion may be selected from a $C_8$ to $C_{26}$ fatty acid anion, in some examples, a $C_{14}$ to $C_{22}$ fatty acid anion, in some examples, a $C_{18}$ to $C_{20}$ fatty acid anion, in some examples, a $C_{17}$, $C_{18}$ or $C_{19}$ fatty acid anion. In some examples, the fatty acid anion is selected from a caprylic acid anion, capric acid anion, lauric acid anion, myristic acid anion, palmitic acid anion, stearic acid anion, arachidic acid anion, behenic acid anion and cerotic acid anion.

The charge adjuvant, which may, for example, be or include a salt of multivalent cation and a fatty acid anion, may be present in an amount of 0.1 wt % to 5 wt % of the solids of the electrostatic ink composition, in some examples, in an amount of 0.1 wt % to 2 wt % of the solids of the electrostatic ink composition, in some examples, in an amount of 0.1 wt % to 2 wt % of the solids of the electrostatic ink composition, in some examples, in an amount of 0.3 wt % to 1.5 wt % of the solids of the electrostatic ink composition, in some examples, about 0.5 wt % to 1.2 wt % of the solids of the electrostatic ink composition, in some examples, about 0.8 wt % to 1 wt % of the solids of the electrostatic ink composition, in some examples, about 1 wt % to 3 wt % of the solids of the electrostatic ink composition, in some examples, about 1.5 wt % to 2.5 wt % of the solids of the electrostatic ink composition.

Colourant

An electrostatic ink composition may comprise a colourant. The colourant may be a dye or pigment. The colourant can be any colourant compatible with the liquid carrier and useful for electrophotographic printing. For example, the colourant may be present as pigment particles, or may comprise a resin (in addition to the polymers described herein) and a pigment. The resins and pigments can be any of those standardly used. In some examples, the colourant is selected from a cyan pigment, a magenta pigment, a yellow pigment and a black pigment. For example, pigments by Hoechst including Permanent Yellow DHG, Permanent Yellow GR, Permanent Yellow G, Permanent Yellow NCG-71, Permanent Yellow GG, Hansa Yellow RA, Hansa Brilliant Yellow 5GX-02, Hansa Yellow X, NOVAPERM® YELLOW HR, NOVAPERM® YELLOW FGL, Hansa Brilliant Yellow 10GX, Permanent Yellow G3R-01, HOSTAPERM® YELLOW H4G, HOSTAPERM® YELLOW H3G, HOSTAPERM® ORANGE GR, HOSTAPERM® SCARLET GO, Permanent Rubine F6B; pigments by Sun Chemical including L74-1357 Yellow, L75-1331 Yellow, L75-2337 Yellow; pigments by Heubach including DALAMAR® YELLOW YT-858-D; pigments by Ciba-Geigy including CROMOPHTHAL® YELLOW 3 G, CROMOPHTHAL® YELLOW GR, CROMOPHTHAL® YELLOW 8 G, IRGAZINE® YELLOW SGT, IRGALITE® RUBINE 4BL, MONASTRAL® MAGENTA, MONASTRAL® SCARLET, MONASTRAL® VIOLET, MONASTRAL® RED, MONASTRAL® VIOLET; pigments by BASF including LUMOGEN® LIGHT YELLOW, PALIOGEN® ORANGE, HELIOGEN® BLUE L 690 IF, HELIOGEN® BLUE TBD 7010, HELIOGEN® BLUE K 7090, HELIOGEN® BLUE L 710 IF, HELIOGEN® BLUE L 6470, HELIOGEN® GREEN K 8683, HELIOGEN® GREEN L 9140; pigments by Mobay including QUINDO® MAGENTA, INDOFAST® BRILLIANT SCARLET, QUINDO® RED 6700, QUINDO® RED 6713, INDOFAST® VIOLET; pigments by Cabot including Maroon B STERLING® NS BLACK, STERLING® NSX 76, MOGUL® L; pigments by DuPont including TIPURE® R-101; and pigments by Paul Uhlich including UHLICH® BK 8200. Where the pigment is a white pigment particle, the pigment particle may be selected from the group consisting of $TiO_2$, calcium carbonate, zinc oxide, and mixtures thereof. In some examples, the white pigment particle may comprise an alumina-$TiO_2$ pigment.

In some examples, the colourant or pigment particles may have a median particle size or $d_{50}$ of 20 µm or less, for example, 15 µm or less, for example, 10 µm or less, for example, 5 µm or less, for example, 4 µm or less, for example, 3 µm or less, for example, 2 µm or less, for example, 1 µm or less, for example, 0.9 µm or less, for example, 0.8 µm or less, for example, 0.7 µm or less, for example, 0.6 µm or less, for example, 0.5 µm or less. Unless otherwise stated, the particle size of the colourant or pigment particle and the resin coated pigment particle is determined by using laser diffraction on a Malvern Mastersizer 2000 according to the standard procedure as described in the operating manual.

The colourant or pigment particle may be present in an electrostatic ink composition in an amount of from 1 wt % to about 90 wt % of the total amount of thermoplastic resin and colourant, in some examples, 5 wt % to 85 wt % of the total amount of thermoplastic resin and colourant, in some examples, 10 wt % to 80 wt % of the total amount of thermoplastic resin and colourant, in some examples, 15 wt % to 80 wt %, in some examples, 15 wt % to 60 wt %, in some examples, 15 wt % to 50 wt %, in some examples, 15 wt % to 40 wt %, in some examples, 15 wt % to 30 wt % of the total amount of thermoplastic resin and colourant. In some examples, the colourant or pigment particle may be present in an electrostatic ink composition in an amount of at least 50 wt % of the total amount of thermoplastic resin and colourant or pigment, for example, at least 55 wt % of the total amount of thermoplastic resin and colourant or pigment.

Additives

The electrostatic ink composition may include an additive or a plurality of additives. The additive or plurality of additives may be added at any stage of the method. The additive or plurality of additives may be selected from a wax, a surfactant, biocides, organic solvents, viscosity modifiers, materials for pH adjustment, sequestering agents, preservatives, compatibility additives, emulsifiers and the like. The wax may be an incompatible wax. As used herein, "incompatible wax" may refer to a wax that is incompatible with the thermoplastic resin. Specifically, the wax phase separates from the resin phase upon the cooling of the resin fused mixture on a print substrate during and after the transfer of the ink film to the print substrate, for example, from an intermediate transfer member, which may be a heated blanket.

Method of Producing a Liquid Electrostatic Ink Composition

Also provided is a method of producing a liquid electrostatic ink composition. The method may comprise suspending in a carrier liquid chargeable particles comprising a thermoplastic resin formed from the reaction of a first resin and a second resin.

In some examples, the method comprises reacting the first resin and the second resin in a carrier liquid, which may be as described herein, for example in connection with the electrostatic ink composition.

In some examples, the method comprises first combining the first resin with the carrier liquid and subsequently adding the second resin. In some examples, the method comprise first combining the first resin with the carrier liquid to form a paste and subsequently adding the second resin.

In some examples, the first resin and the carrier liquid are combined and heated to an elevated temperature. In some examples, the first resin and the carrier liquid are combined and heated to a temperature above the melting point of the first resin. The melting point of the first resin may be determined by differential scanning calorimetry, for example, using ASTM D3418. In some examples, the first resin and the carrier liquid are combined and heated to a temperature of at least 70° C., for example, at least 80° C., for example, at least 90° C., for example, at least 100° C., for example, at least 110° C., for example, at least 120° C., for example, 130° C., for example, to melt the resin. In some examples, the first resin and carrier liquid are heated until the first resin has melted and/or dissolved in the carrier liquid. Melting and/or dissolving of the first resin in the carrier liquid may result in the carrier fluid appearing clear and homogeneous. In some examples, the first resin and carrier liquid are heated before, during or after mixing. In some examples, the first resin and the carrier liquid are mixed at a mixing rate of 500 rpm or less, for example, 400 rpm or less, for example, 300 rpm or less, for example, 200 rpm or less, for example, 100 rpm or less, for example, 75 rpm or less, for example, 50 rpm. In some examples, mixing may continue until melting and/or dissolution of the first resin in the carrier liquid is complete.

In some examples, the first resin and the carrier liquid are combined, causing the first resin to swell with the carrier liquid. In some examples, the first resin and the carrier liquid are combined and heated, causing the first resin to swell with the carrier liquid. In some examples, the first resin and the carrier liquid are combined and heated, causing swelling and solvation of the first resin with the carrier liquid. In some examples, swelling of the first resin with the carrier liquid improves reactivity of the first resin with the second resin.

In some examples, the second resin is heated before it is added to the first resin and the carrier liquid. In some examples, the second resin is heated to at least 30° C., in some examples, at least 40° C., in some examples, at least 45° C., in some examples, at least 50° C. before it is added to the first resin and the carrier liquid. In some examples, the second resin is heated to 100° C. or less, in some examples, 90° C. or less, in some examples, 80° C. or less, in some examples, 70° C. or less, in some examples, 75° C. or less, in some examples, 60° C. or less before it is added to the first resin and the carrier liquid. In some examples, the second resin is heated to reduce the viscosity of the second resin before it is added to the first resin and the carrier liquid.

In some examples, adding the second resin to the first resin and the carrier liquid comprises mixing the second resin with the first resin and the carrier liquid. In some examples, adding the second resin to the first resin and the carrier liquid initiates the reaction of the first resin and the second resin. In some examples, the reaction of the first resin and the second resin is initiated by heat. In some examples, the reaction of the first resin and the second resin is initiated at a temperature of at least 70° C., for example, at least 80° C., for example, at least 90° C., for example, at least 100° C., for example, at least 110° C., for example, at least 120° C., for example, 130° C. In some examples, the reaction of the first resin and the second resin occurs under mixing, in some examples, at a rate of 500 rpm or less, for example, 400 rpm or less, for example, 300 rpm or less, for example, 200 rpm or less, for example, 100 rpm or less, for example, 75 rpm or less, for example, 50 rpm.

In some examples, the first resin reacts with the second resin to form the thermoplastic resin in the carrier liquid. In some examples, after the reaction, the thermoplastic resin in the carrier liquid is cooled to a temperature below the melting point of the thermoplastic resin, for example, to room temperature. In some examples, the thermoplastic resin is removed from the carrier liquid and redispersed in a new portion of carrier liquid, which may be the same or a different carrier liquid.

In some examples, the method comprises adding a colourant to the thermoplastic resin and the carrier liquid. In some examples, the method comprises adding a colourant to the thermoplastic resin and the carrier liquid to form chargeable particles comprising the thermoplastic resin and a colourant. In some examples, the method comprises grinding the colourant and the thermoplastic resin in the presence of the carrier liquid to form a paste. In some examples, the method comprises heating and mixing the colourant and the thermoplastic resin in the presence of the carrier liquid to form a paste.

In some examples, the method comprises adding a charge adjuvant to the thermoplastic resin and the carrier liquid and optionally grinding. In some examples, the method comprises adding a charge adjuvant and a colourant to the thermoplastic resin and the carrier liquid and optionally grinding.

In some examples, the method comprises grinding at a grinding speed of at least 50 rpm. In some examples, the method comprises grinding at a grinding speed of up to about 600 rpm. In some examples, the method comprises grinding for at least 1 h, in some examples, for at least 2 h. In some examples, the method comprises grinding for up to about 12 h. In some examples, the method comprises grinding at a temperature of at least about 35° C. In some examples, the method comprises grinding at a temperature of at least about 50° C. for a first time period, in some examples, for at least 1 h, in some examples, for at least 1.5 h and then reducing the temperature to a temperature of at least 30° C., in some examples, at least 35° C. and continuing grinding for at least 5 h, in some examples, at least 9 h, in some examples, at least 10 h.

Method of Producing a Printed Article

Also provided is a method of producing a printed article. The method comprising applying an electrostatic ink composition to a substrate with a electrostatic printer. In some examples, during the printing, the electrostatic ink composition is a liquid electrostatic ink composition.

In some examples, the method comprises electrostatically printing a liquid electrostatic ink composition on a substrate with a liquid electrostatic printer.

In some examples, liquid electrostatically printing a liquid electrostatic ink composition comprises contacting the liquid electrostatic ink composition with a latent electrostatic image on a surface to create a developed image and transferring the developed image to a substrate, in some examples, via an intermediate transfer member.

In some examples, the surface on which the (latent) electrostatic image is formed or developed may be on a rotating member, for example, in the form of a cylinder. The surface on which the (latent) electrostatic image is formed or developed may form part of a photoimaging plate. The method may involve passing the electrostatic ink composition between a stationary electrode and a rotating member, which may be a member having the surface having the (latent) electrostatic image thereon or a member in contact with the surface having the (latent) electrostatic image thereon. A voltage is applied between the stationary electrode and the rotating member, such that particles adhere to the surface of the rotating member. The intermediate transfer member, if present, may be a rotating flexible member, which may be heated, for example, to a temperature of from 80 to 160° C.

The substrate onto which the ink composition is applied may be any suitable substrate. In some examples, the substrate may be any substrate capable of having an image printed thereon. In some examples, the substrate may include a material selected from an organic or inorganic material. The material may include a natural polymeric material, for example, cellulose. The material may include a synthetic polymeric material, for example, a polymer formed from alkylene monomers, including, for example, polyethylene and polypropylene, and co-polymers such as styrene-butadiene polymers. The polypropylene may, in some examples, be biaxially orientated polypropylene. The material may include a metal, which may be in sheet form. The metal may be selected from or made from, for instance, aluminium (Al), silver (Ag), tin (Sn), copper (Cu), and mixtures thereof. In an example, the substrate includes a cellulosic paper. In an example, the cellulosic paper is coated with a polymeric material, for example, a polymer formed from styrene-butadiene resin. In some examples, the cellulosic paper has an inorganic material bound to its surface (before printing with ink) with a polymeric material, wherein the inorganic material may be selected from, for example, kaolinite or calcium carbonate. The substrate is, in some examples, a cellulosic substrate, such as paper. The cellulosic substrate is, in some examples, a coated cellulosic substrate. In some examples, a primer may be coated onto the substrate before the electrostatic ink composition is printed onto the substrate.

EXAMPLES

The following illustrates examples of the compositions and related aspects described herein. Thus, these examples should not be considered to restrict the present disclosure, but are merely in place to teach how to make examples of compositions of the present disclosure.

Materials
Resins (First Resins)
NUCREL® 699 (DUPONT™): a copolymer of ethylene and methacrylic acid, made with nominally 11 wt % methacrylic acid.
AC-5120 (Honeywell): ethylene-acrylic acid copolymer with an acid number of 112-130 KOH/g.
Modified Epoxy Resins (Second Resins)
A1 (HYPOX® UA10; available from CVC Thermoset Specialties): A reaction product of Bisphenol A epoxy resin with 12% (w/w) thermoplastic polyurethane (TPU). Viscosity at 25° C.: 720K mPa·s.
A2 (HYPOX® UA11; available from CVC Thermoset Specialties): A reaction product of Bisphenol A epoxy resin with 5% (w/w) TPU. Viscosity at 25° C.: 32K mPa·s.
A3 (HYPOX® RA95; available from CVC Thermoset Specialties): A reaction product of Bisphenol A epoxy resin with 5% (w/w) carboxy-terminated butadiene-acrylonitrile (CTBN) elastomer, in which the CTBN has a very high acrylonitrile content. Viscosity at 52° C.: 22K mPa·s.
A4 (HYPOX RF1320; available from CVC Thermoset Specialties): A reaction product of Bisphenol F epoxy resin with 20% (w/w) 74:26 carboxy-terminated butadiene:acrylonitrile (CTBN) liquid rubber. Viscosity at 25° C.: 32K mPa·s.
Carrier Liquid:
ISOPAR-L™ (available form EXXON): an isoparafinic oil.
Charge Adjuvant:
VCA (available from Sigma-Aldrich): an aluminium stearate.

Charge Director:
NCD: a natural charge director having the components (i) natural soya lecithin, (ii) basic barium PETRONATE™, and (iii) dodecyl benzene sulfonic acid, amine salt, with the components (i), (ii) and (iii) being present in weight ratios of 6.6%:9.8%:3.6%.
Colorant:
A black pigment.
Standard Procedure
A paste was formed by mixing resins NUCREL® 699 and AC-5120 [80:20 (w/w); 900 g total (720 g:180 g); first resin] in the presence of a carrier liquid (ISOPAR-L™; 1500 g) in a Ross reactor (Model DPM-2, obtained from Charles Ross & Son Company—Hauppauge N.Y.) at 130° C. and 50 rpm for 1 h. During this time, the resins melt and are swollen by the carrier liquid.

In parallel, the modified epoxy resin (100 g; second resin) was heated in an oven at 50-60° C. to reduce its viscosity.

Next, the heated modified epoxy resin was added to the heated resins. The mixture was then heated to 130° C. at 70 rpm for 1.5 h. The temperature was then reduced slowly to room temperature (≈25° C.) over at least 4 h.

A colourant was ground with the paste at a ratio of 25:74 (colorant:total resin content) by weight for 12 h in the presence of 1.2 wt % charge adjuvant (VCA) in an attritor at 58° C. for 1.5 h and then further ground at 36° C. for 10.5 h.

The ground material was then diluted with ISOPAR-L™ to form a 2 wt % NVS ink composition. A charge director (NCD, as described above) was then added (10-15 mg/1 g carrier liquid) to form a liquid electrostatic ink composition.

Example 1

A liquid electrostatic ink was formulated using modified epoxy resin A1 in the standard procedure above.

Example 2

A liquid electrostatic ink was formulated using modified epoxy resin A2 in the standard procedure above.

Example 3

A liquid electrostatic ink was formulated using modified epoxy resin A3 in the standard procedure above.

Example 4

A liquid electrostatic ink was formulated using modified epoxy resin A4 in the standard procedure above.
Reference Ink
A reference liquid electrostatic ink was formulated by following the standard procedure above, omitting the modified epoxy resin and using a total of 1000 g of the resins.
Formulation Table
Resin Paste (at 40 wt %):

|  |  | Example 1 [g] | Example 2 [g] | Example 3 [g] | Example 4 [g] | Reference Ink [g] |
|---|---|---|---|---|---|---|
| Second resin | A1 | 100 | — | — | — | — |
|  | A2 | — | 100 | — | — | — |
|  | A3 | — | — | 100 | — | — |
|  | A4 | — | — | — | 100 | — |

-continued

|  |  | Example 1 [g] | Example 2 [g] | Example 3 [g] | Example 4 [g] | Reference Ink [g] |
|---|---|---|---|---|---|---|
| First resin | Nucrel ® 699 | 720 | 720 | 720 | 720 | 800 |
|  | AC-5120 | 180 | 180 | 180 | 180 | 200 |
| Carrier liquid | Isopar L | 1500 | 1500 | 1500 | 1500 | 1500 |

Ink (20 wt % Solids):

|  |  | Example 1 [g] | Example 2 [g] | Example 3 [g] | Example 4 [g] | Reference Ink [g] |
|---|---|---|---|---|---|---|
| Resin paste amount |  | 854 | 903 | 840 |  | 903 |
| Pigment |  | 93 | 93 | 93 |  | 93 |
| Charge adjuvant | VCA | 5.9 | 5.9 | 5.9 |  | 5.9 |
| Charge director | NCD | 12 | 15 | 9 |  | 50 |
| Carrier Liquid | ISOPAR-L ™ | 1320 | 1270 | 1330 |  | 1270 |

Reaction Monitoring

The formation of the paste of the first and second resins in Examples 1, 2 and 4, as well as the reference ink, was monitored by FT-IR spectroscopy. The FT-IR spectra for Examples 1, 2 and 4 show a reduction in the size of the peak representing the epoxy functionality during the reaction, showing that cross-linking of the first resin with the second resin occurs. The FT-IR spectra for Examples 1 and 2 show that almost all of the epoxy groups react with the acids in the first resin.

Differential scanning calorimetry (DSC) was also performed on the pastes of the first and second resins in Examples 1, 2 and 4. The results of the DSC measurements can be seen in the table below:

|  | First heating cycle | | | Second heating cycle | | |
|---|---|---|---|---|---|---|
|  | Peak T [° C.] | Enthalpy (normalized) [JKg$^{-1}$] | Onset T [° C.] | Peak T [° C.] | Enthalpy (normalized) [JKg$^{-1}$] | Onset T [° C.] |
| Reference Paste | 66.8 | 31.3 | 64.2 | 93.5 | 37.3 | 78.5 |
| Ex. A1 1 (10 wt %) | 69.8 | 40.3 | 32 | 92.7 | 38.4 | 70.9 |
| Ex. A2 2 (10 wt %) | 72.6 | 39.5 | 32 | 91.1 | 34.7 | 69 |
| Ex. A4 4 (10 wt %) | 78.8 | 37.1 | 48.3 | 89.6 | 38 | 67 |

These DSC measurements show that the first heating cycle the presence of an epoxy resin increases the peak temperature of the paste in comparison to that of the reference paste. However, once the carrier solvent has been removed from the paste (the second heating cycle), the peak temperature is similar to that of the reference paste.

Peeling Test—Example 1

Peeling tests were performed on several substrates at different coverages (100%, 200%, 300% and 400%) of black ink.

Six horizontal strips of black reference ink were printed at variable coverages (3 strips at 100% coverage and one strip at each of 200%, 300% and 400%) by using an HP® INDIGO MERON™ 7500 series LEP printing press.

A vertical strip of the liquid electrostatic ink produced in Example 1 was printed by using an HP® INDIGO MERON™ 7500 series LEP printing press at variable coverage such that each of the six horizontal strips of black reference ink is overprinted with liquid electrostatic ink at a coverage corresponding to that of the horizontal strip (3 strips were overprinted with 100% coverage and one strip at each of 200%, 300% and 400%).

Ten minutes after completing the printing, adhesive tape (scotch tape number 234; available from 3M company) was applied to the vertical strip of liquid electrostatic ink. The adhesive tape was removed rapidly at 90° over 2 seconds.

Four different substrates were used in these tests: Euroart (EA; coated), Fortune matt (FM; coated matt), Soproset (SS; uncoated), UPM (coated) and CON (coated).

Peeling Tests—Examples 2-4

Peeling tests for the liquid electrostatic inks produced in Examples 2 to 4 were performed in the same manner as described for Example 1. The results showed the inks according to the present disclosure had improved resistance to peeling, on all substrates and at all % ink coverages tested, compared to the reference inks, which lacked the second resin.

Full Colour Peeling Mechanism Tests

Six horizontal strips of black reference ink at were printed at variable coverages (3 strips at 100% coverage and one strip at each of 200%, 300% and 400%) by using an HP® INDIGO MERON™ 7500 series LEP printing press. A four colour vertical strip of liquid electrostatic ink was printed on UPM coated paper by using an HP® INDIGO MERON™ 7500 series LEP printing press at variable coverage such that each of the six horizontal strips of black reference ink is overprinted with four liquid electrostatic inks at a coverage corresponding to that of the horizontal strip. Each colour of liquid electrostatic ink was printed at coverages such that 3 strips were overprinted with 100% coverage of each ink (i.e., 400% coverage in total) and one strip at each of 200%, 300% and 400%. Three of the four coloured inks used were reference inks (yellow, magenta and cyan) and one ink was an ink according to Example 1 (black). Two different print orders were tested to supply further information regarding the adhesion mechanism of the additives.

Test A: The four liquid electrostatic inks applied as follows:
1. Yellow reference ink (no second resin) was applied directly onto the six horizontal strips of black reference ink;
2. Magenta reference ink (no second resin) was applied directly onto the yellow reference ink;
3. Cyan reference ink (no second resin) was applied onto the magenta reference ink;
4. Black ink according to Example 1 was applied onto the cyan reference ink.

Test B: The four liquid electrostatic inks applied as follows:
1. Black ink according to Example 1 was applied onto the cyan reference ink;
2. Yellow reference ink (no second resin) was applied directly onto the six horizontal strips of black reference ink;

3. Magenta reference ink (no second resin) was applied directly onto the yellow reference ink;
4. Cyan reference ink (no second resin) was applied onto the magenta reference ink.

Thus, in test A, the adhesive tape is adhered directly to the black ink according to Example 1 and, in test B, the adhesive tape is adhered directly to the cyan reference ink.

The results of peeling test A showed no difference in adhesion between the use of four reference inks and the use of black ink according to Example 1 applied as the uppermost ink layer, that is, directly in contact with the adhesive tape but not with the substrate. In contrast, peeling test B shows improved adhesion of the inks to the substrate. Thus, it is clear that the epoxy resin compound, that is, the second resin, improves the adhesion of the ink to the substrate.

Further Tests and Observations

In separate tests, it was also found that the inks according to the disclosure, i.e., formed from the first and second resins, had improved scratch resistance compared to a reference ink that lacked a second resin.

It was further found that the concentration of charge director required to reach a particular charging level in the liquid electrostatic inks according to the disclosure, i.e., formed from the first and second resins, was about ⅓ of the concentration required with a reference ink that lacked a second resin.

The rub resistance of inks according to the disclosure, i.e., formed from the first and second resins, were comparable to a reference ink that lacked a second resin.

While the invention has been described with reference to certain examples, those skilled in the art will appreciate that various modifications, changes, omissions, and substitutions can be made without departing from the spirit of the disclosure. It is intended, therefore, that the invention be limited by the scope of the following claims. Unless otherwise stated, the features of any dependent claim can be combined with the features of any of the other dependent claims and any of the independent claims.

The invention claimed is:

1. A liquid electrostatic ink composition comprising:
   a. a carrier liquid; and
   b. chargeable particles suspended in the carrier liquid, wherein the chargeable particles comprise a thermoplastic resin formed from the reaction of a first resin and a second resin, wherein
      i. the first resin comprises a polymer having acidic side groups; and
      ii. the second resin comprises an epoxy resin component and an elastomeric component, wherein the epoxy resin component has one or more epoxide groups per molecule.

2. The liquid electrostatic ink composition according to claim 1, wherein the second resin comprises 1 wt % to 30 wt % elastomeric component.

3. The liquid electrostatic ink composition according to claim 1, wherein the first resin constitutes 60 wt % or more of the thermoplastic resin.

4. The liquid electrostatic ink composition according to claim 1, wherein the epoxy resin component comprises a copolymer of a polyhydric alcohol and an epoxide-containing monomer.

5. The liquid electrostatic ink composition according to claim 1, wherein the epoxy resin component comprises a copolymer of a bisphenol-containing monomer and an epoxide-containing monomer.

6. The liquid electrostatic ink composition according to claim 1, wherein the epoxy resin component is selected from bisphenol A epoxy resin or bisphenol F epoxy resin.

7. The liquid electrostatic ink composition according to claim 1, wherein the elastomeric component of the second resin is a thermoplastic polyurethane or a butadiene-acrylonitrile elastomer.

8. The liquid electrostatic ink composition according to claim 1, wherein the chargeable particles comprise a colourant.

9. A method for producing a liquid electrostatic ink composition, the method comprising:
   suspending in a carrier liquid chargeable particles comprising a thermoplastic resin formed from the reaction of a first resin and a second resin, wherein
      the first resin comprises a polymer having acidic side groups; and
      the second resin comprises an epoxy resin component and an elastomeric component, wherein the epoxy resin component has one or more epoxide groups per molecule.

10. The method according to claim 9, wherein the first resin and the second resin are reacted in the carrier liquid.

11. The method according to claim 9, wherein a colourant is added to the suspension of the thermoplastic resin in the carrier liquid.

12. The method according to claim 10, wherein the method comprises first combining the first resin with the carrier liquid and subsequently adding the second resin.

13. The method according to claim 10, wherein the method comprises combining the first resin and the carrier liquid and heating to a temperature above the melting point of the first resin and subsequently adding the second resin.

14. The method according to claim 12, wherein the second resin is heated to at least 30° C. before it is added to the first resin and the carrier liquid.

15. A method of producing a printed article, the method comprising applying an electrostatic ink composition to a substrate with a liquid electrostatic printer, wherein the electrostatic ink composition comprises
   a thermoplastic resin formed from the reaction of a first resin and a second resin, wherein
      i. the first resin comprises a polymer having acidic side groups; and
      ii. the second resin comprises an epoxy resin component and an elastomeric component, wherein the epoxy resin has one or more epoxide groups per molecule.

16. The method according to claim 15, wherein the second resin comprises 1 wt % to 30 wt % elastomeric component.

17. The method of claim 1, wherein the first resin constitutes 60 wt % or more of the thermoplastic resin.

18. The method according to claim 15, wherein the epoxy resin component comprises a copolymer of a polyhydric alcohol and an epoxide-containing monomer.

19. The method according to claim 15, wherein the epoxy resin component comprises a copolymer of a bisphenol-containing monomer and an epoxide-containing monomer.

20. The method according to claim 15, wherein the elastomeric component of the second resin is a thermoplastic polyurethane or a butadiene-acrylonitrile elastomer.

* * * * *